United States Patent [19]

Lassallette et al.

[11] Patent Number: 4,531,124
[45] Date of Patent: Jul. 23, 1985

[54] DEVICE FOR PROCESSING LOGARITHMIC SIGNALS, AND ITS APPLICATION TO A FREQUENCY DIVERSITY RADAR

[75] Inventors: Jean L. Lassallette; Guy Lepère; Gérard Rotat, all of Paris, France

[73] Assignee: Thomson CSF, Paris, France

[21] Appl. No.: 327,713

[22] Filed: Dec. 4, 1981

[30] Foreign Application Priority Data

Dec. 5, 1980 [FR] France .................. 80 25909

[51] Int. Cl.³ .................. G01S 13/16; G06F 7/566
[52] U.S. Cl. .................. 343/5 DP; 364/768; 343/17.2 R
[58] Field of Search .................. 343/17.2 R, 17.1 R, 343/5 DP, 5 NQ, 7 A, 16 M, 5 VQ, 5 CF, 7.3; 328/145; 307/492, 490; 364/754, 761, 757, 764, 768, 784

[56] References Cited

U.S. PATENT DOCUMENTS 4,121,212 10/1978 Taylor .................. 343/17.1 R

OTHER PUBLICATIONS

The Metamorphosis of Software-Related Invention Patentability, by Nelson Moskowitz from Computer/Law Journal, vol. III, Spring 1982, No. 3, pp. 273-336.

Primary Examiner—T. H. Tubbesing
Assistant Examiner—John B. Sotomayor
Attorney, Agent, or Firm—Cushman, Darby & Cushman

[57] ABSTRACT

The device for processing logarithmic signals is intended to deliver the logarithm of the sum of the signals which are given under the logarithm sign. The digital processing device receives at least two logarithmic signals and comprises a subtracting circuit for forming the difference between the logarithmic signals applied to the inputs and a transcoder circuit for performing the operation $$\text{Log}\left(1 + \frac{r1}{r2}\right)$$

where Log r1 and Log r2 are respectively the signals applied to the inputs of the device and an adding circuit for performing the operation $$\text{Log } r2 + \text{Log}\left(1 + \frac{r1}{r2}\right)$$

and delivering the desired signal Log (r1+r2).

8 Claims, 5 Drawing Figures

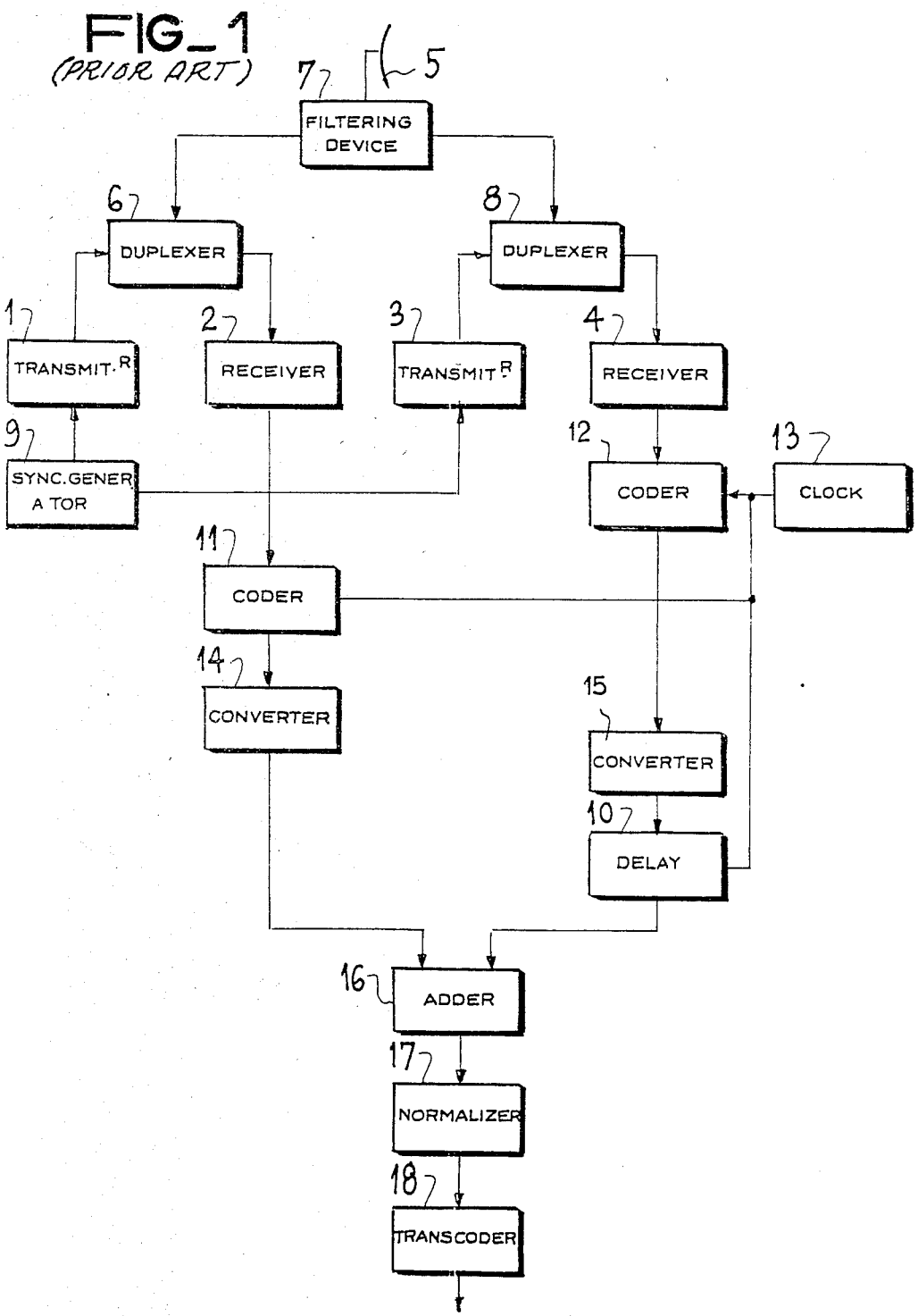

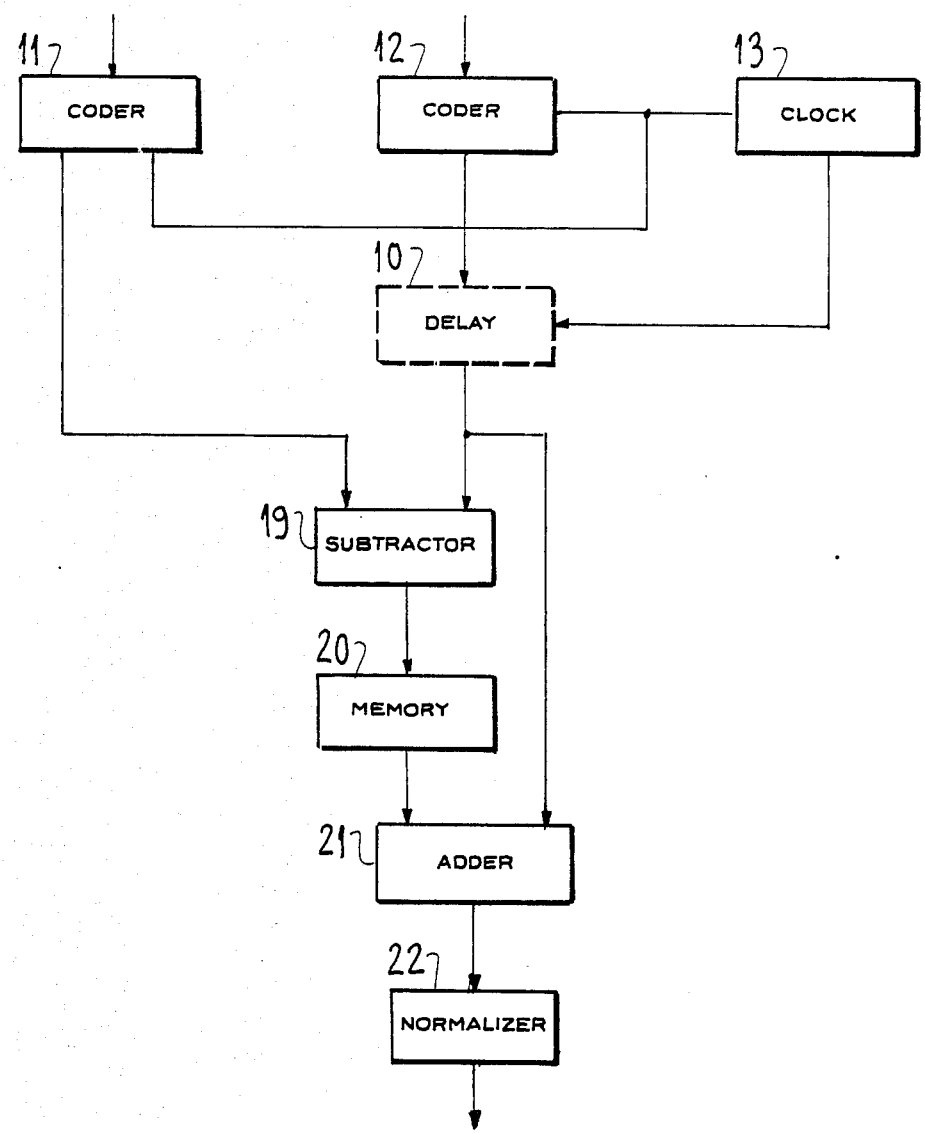

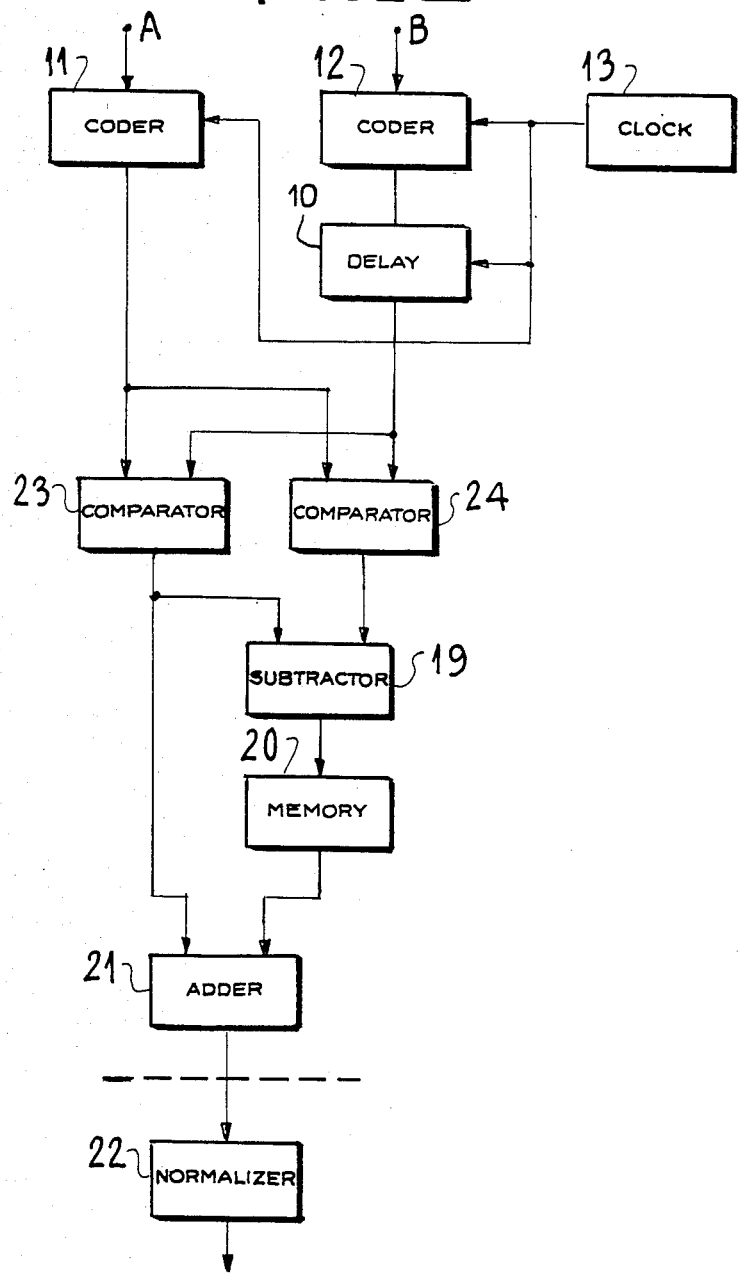

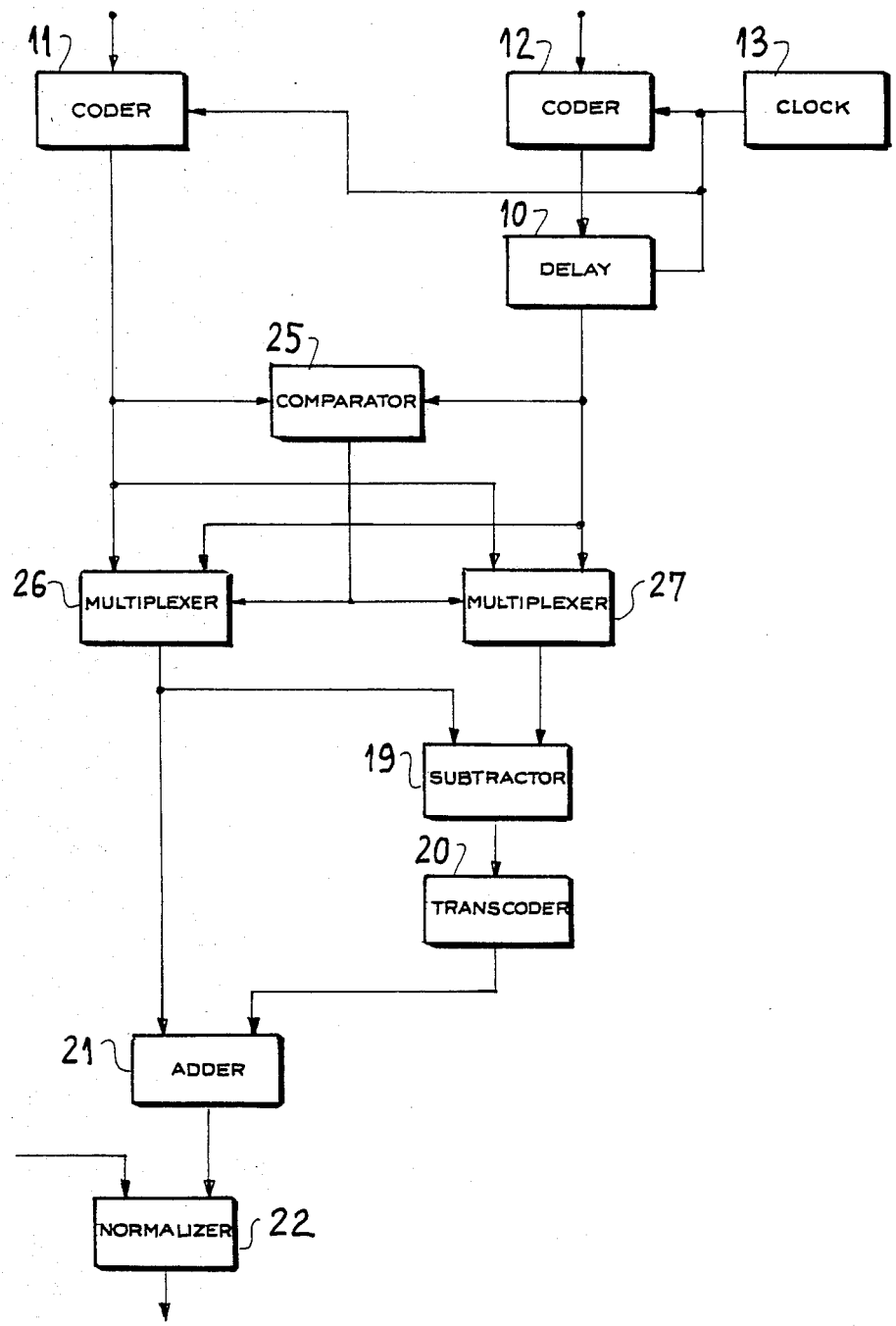

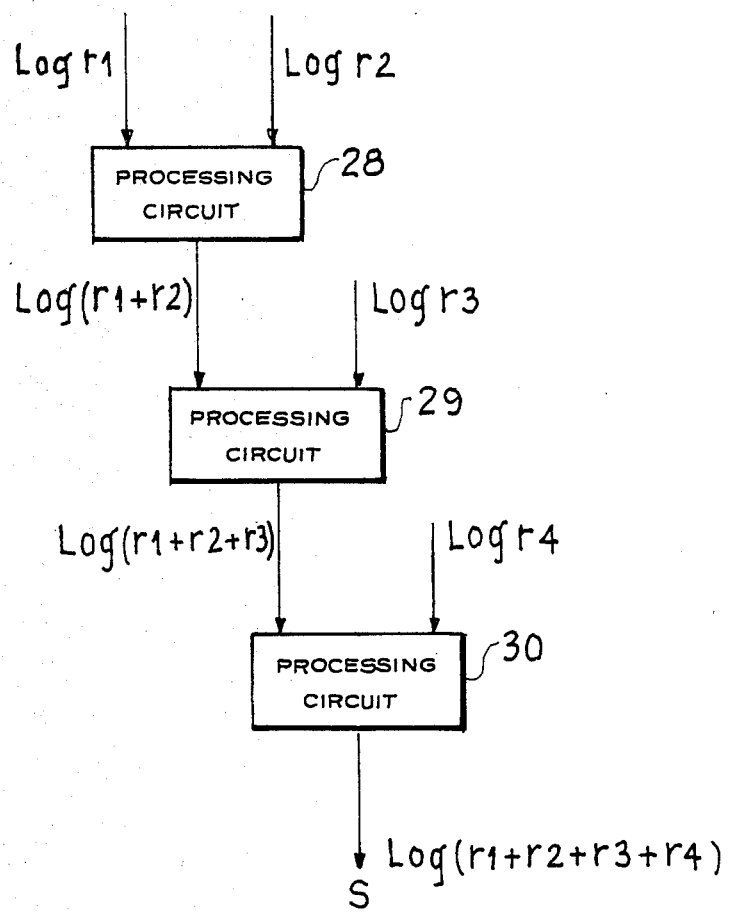
FIG_5

DEVICE FOR PROCESSING LOGARITHMIC SIGNALS, AND ITS APPLICATION TO A FREQUENCY DIVERSITY RADAR

This invention relates to a device for processing logarithmic signals with a view to delivering the logarithm of the sum of the signals applied to said device, said signals being expressed in their logarithmic form.

The invention further relates to the direct application of said device to a radar system designed for frequency diversity operation and to a frequency diversity radar equipped with a device of this type.

For reasons relating to ease of understanding and clarity of the following specification, consideration will hereinafter be given to a frequency diversity radar in which signals delivered by the receivers are added in video and expressed in logarithmic form, although it will be understood that this application is given by way of example and does not imply any limitations of the invention. Under these conditions, the device for processing logarithmic signals which forms the subject of the present patent application is described within the scope of its application.

The process and effects of frequency diversity are already known and have been described in the literature, in which the following relevant example may be cited: "Radars" by David K. Barton, vol. 6, Frequency agility and diversity—The Artech Radar Library.

FIG. 1 is a conventional schematic diagram of a radar system designed for frequency diversity operation in which recombination or addition of logarithmic video signals is carried out with a view to obtaining at the output of the device the logarithm of the sum of the video signals obtained in the form of analog signals.

A radar which operates on the principle of frequency diversity comprises two transmitters 1 and 3 and two receivers 2 and 4. Each transmitter-receiver unit operates at a different frequency, namely F1 and F2. The transmitter-receiver unit 1-2 which operates at the frequency F1, for example, is connected to the antenna 5 through a duplexing circuit 6 and a filtering device 7 which serves to separate the signals received by the antenna 5 according to their frequency. Similarly, the transmitter-receiver unit 3-4 is connected to the antenna 5 through a duplexing circuit 8 and the filtering device 7. In order not to complicate the description, it will be assumed that the intermediate-frequency stages, the local oscillators and the detectors are contained within the transmitter-receiver units. In consequence, the signals delivered by the receivers 2 and 4 are video signals. Supposing that the receivers are logarithmic receivers characterized by a very broad dynamic range of the order of 80 to 90 dB, for example, the signals delivered by said receivers 2 and 4 are logarithmic video signals designated by the references Log r1 and Log r2 in which the references r1 and r2 represent the video signals in their analog form known as linear video. Provision is made for a synchronization generator 9 and the pulses turn-on the transmitters 1 and 3. These pulses, however, are relatively displaced by a time interval $\Delta T$ from one transmitter to the next. At the receiving end also, the video signals delivered by the receivers are relatively displaced by said value $\Delta T$ in a delay circuit 10, thus permitting recombination in order to provide a better definition of moving targets.

In FIG. 1 relating to the prior art, the device for processing video-logarithmic signals Log r1 and Log r2 is designed for digital representation. At the output of the receiver 2, 4, the signals Log r1 and Log r2 are then coded in coders 11, 12 which are controlled by the clock pulses 13. The pulses delivered by the coders 11 and 12 are transmitted to converters 14, 15 or transcoders which convert the logarithmic signals to linear signals, namely the signals r1 and r2 respectively. These converters are usually programmed read-only memories (PROM). Provision is made for a large number of memories if it is desired to maintain the broad dynamic range which is characteristic of the logarithmic signals since the number of bits required for this purpose is very considerable. One of the series of signals is then delayed by the value $\Delta T$ within the delay circuit 10 and the "linear" signals r1 and r2 are then applied to the terminals of an adding circuit 16 which delivers the sum of the signals r1 and r2. Under the conditions herein described, the adding circuit 16 is a digital circuit for performing bit-by-bit addition of the binary words r1 and r2. Within the scope of the radar application, a so-called normalizing operation is carried out on the sum r1+r2 in a circuit 17. This operation consists in dividing the sum by $\sqrt{2}$ and has the effect of reducing the noise at the time of addition of the signals. Said normalizing circuit 17 is connected to a transcoding circuit 18 which performs transcoding of Lin towards Log and delivers at its output S the expression $$\text{Log} \frac{r1 + r2}{\sqrt{2}}$$

that is, the logarithm of the sum of signals r1 and r2 obtained from the signals Log r1 and Log r2.

In the prior art, it has been found that direct recombination of signals given in their logarithmic form was not a practical possibility, with the result that it has proved necessary to resort to the agency of video signals reconverted to linear video signals. It is also found in practice that the last operation performed by the transcoding circuit 18 which again delivers the summated video in its logarithmic form calls for the use of very large capacity PROM dead memory tables if it is desired to process the entire dynamic range of logarithmic signals. By way of example, in order to process logarithmic video signals within a dynamic range of 80 to 90 dB, the Lin-Log transcoding table may have a capacity of $64K \times 8$ bits (sixteen address bits and eight bits). In order to reduce the volume of the dead memories, it has often proved necessary in the prior art to clip the signal produced by Log-Lin transcoding within the transcoding circuit 11-12, thus producing a reduction in dynamic range of 20 dB.

Recombination of logarithmic signals in accordance with the definition given earlier therefore suffers from a certain number of disadvantages and the present invention accordingly proposes to overcome these disadvantages.

The aim of the invention is to process the logarithmic signals in a simple manner so as to permit direct recombination of said signals without passing through any intermediate stage of double conversion of logarithmic signals to linear signals and conversely. This objective is achieved while maintaining the broad dynamic range of said signals and without utilizing large-capacity dead memory tables.

In accordance with the invention, a device for digital processing of logarithmic signals receives at least two signals in logarithmic form and delivers a logarithmic signal of the sum of said signals under the logarithm sign. The distinguishing feature of the device lies in the fact that the input signals in logarithmic form, namely Log r1 and Log r2, are applied to a subtracting circuit for delivering a logarithm signal of the ratio of said signals, namely Log (r1/r2), said subtracting circuit being connected to a transcoding circuit for delivering the signal $$\mathrm{Log}\left(1 + \frac{r1}{r2}\right)$$

to an addition circuit for receiving on a second input the signal which has been subtracted in the subtraction circuit.

According to an alternative embodiment of the invention, the processing device comprises a circuit for determining the signal of maximum value or of minimum value among the logarithmic signals applied to the device.

Other features of the invention will be more apparent upon consideration of the following description and accompanying drawings in which FIG. 1 has already been discussed in connection with the prior art, and in which:

FIG. 2 shows a processing device according to the invention;

FIG. 3 shows an alternative embodiment of the device according to the invention;

FIG. 4 shows a more detailed embodiment of the device of FIG. 3;

FIG. 5 is a schematic diagram of a complete processing device for the addition of a plurality of signals.

As already reported in the introductory part of this specification, it appears both difficult and costly to form the sum or the recombination of at least two signals when these latter are available in their logarithmic form.

In accordance with the prior art recalled earlier, achievement of the desired result necessarily entails the need to convert the signals received in logarithmic form to the linear form in order to add said signals and then to reconvert the sum signal thus obtained with a view to obtaining said signal in its logarithmic form. The processing of signals involved in all these operations calls for a considerable amount of equipment, especially if it is desired to retain the advantage of the broad dynamic range which is characteristic of logarithmic signals.

In accordance with the invention, the aforementioned sum is formed by means of the direct method, that is to say by avoiding the double conversion of signals from their logarithmic form to their analog form and then from the analog form of the result of the addition operation to its logarithmic form.

The construction of the devices according to the invention is based on the following observation, namely that the received signals can be processed in a simple manner.

In the event that two signals are available, the input signals are represented by the expression Log r1 and Log r2.

The device according to the invention must deliver the expression

Log (r1+r2).

It will be noted that, if the signal r1 is assumed to be of higher value than the signal r2, we may write:

$$\mathrm{Log}\,(r1 + r2) = \mathrm{Log}\,r1\left(1 + \frac{r2}{r1}\right)$$

$$= \mathrm{Log}\,r1 + \mathrm{Log}\left(1 + \frac{r2}{r1}\right)$$

This expression shows that it is necessary to perform the addition of the signal Log r1 and of the signal $$\mathrm{Log}\left(1 + \frac{r2}{r1}\right).$$

In order to calculate the signal last mentioned, it is first determined that:

$$\mathrm{Log}\frac{r2}{r1} = \mathrm{Log}\,r2 - \mathrm{Log}\,r1$$

and this expression is used in order to calculate $$\mathrm{Log}\left(1 + \frac{r2}{r1}\right)$$

in a PROM dead memory programmed for this purpose.

If the signal r2 is of higher value than the signal r1, it is thus determined that:

$$\mathrm{Log}\,(r1 + r2) = \mathrm{Log}\,r2\left(1 + \frac{r1}{r2}\right) =$$

$$\mathrm{Log}\,r2 + \mathrm{Log}\left(1 + \frac{r1}{r2}\right).$$

The following operation is consequently determined from the input signals:

$$\mathrm{Log}\,r2 - \mathrm{Log}\,r1 = \mathrm{Log}\frac{r2}{r1}$$

and then $$\mathrm{Log}\left(1 + \frac{r2}{r1}\right)$$

in a PROM dead memory.

FIG. 2 shows a first embodiment of a device according to the invention in which operators which are capable of processing both positive numbers and negative numbers are employed. It is not necessary in this case to make any assumption on the compared magnitude of the signals r1 and r2. The binary words which are representative of the expression Log r1 and Log r2 comprise a sign bit which will be taken into account in the transcoding circuit for performing the operation:

$$\text{Log}\left(1 + \frac{r1}{r2}\right)$$

The device of FIG. 2 essentially comprises a subtraction circuit 19 to which are applied the signals Log r1 and Log r2 which have previously been coded in the coding circuits 11 and 12 controlled by the clock 13. Said subtraction circuit delivers the difference expression of the applied signals, namely:

Log r1 − Log r2 that is, $$\text{Log}\frac{r1}{r2}$$

The subtraction circuit 19 is connected to a PROM dead-memory transcoding circuit 20 which performs the operation:

$$\text{Log}\left(1 + \frac{r1}{r2}\right)$$

from the signal $$\text{Log}\frac{r1}{r2}$$

which it receives.

Depending on the sign of the bit of the sign of the binary expression of the applied signal, said memory 20 can also give the signal $$\text{Log}\left(1 + \frac{r2}{r1}\right)$$

An adding circuit 21 receives on the one hand the expression $$\text{Log}\left(1 + \frac{r1}{r2}\right)$$

from the transcoding circuit 20 and on the other hand the expression Log r2 from the circuit 12, the last-mentioned expression having been subtracted within the subtractor 19. In accordance with the process described in the foregoing, the addition circuit 21 delivers the desired expression Log (r1+r2).

In the application of said logarithmic signal addition device to a frequency-diversity radar which is contemplated by way of example, the diagram of FIG. 2 must be completed. A delay circuit 10 which delays one of the signals with respect to the other by the value ΔT mentioned earlier is inserted in the line which connects the coder 12 to the subtractor 19. Moreover, in a diversity radar, it is desired to obtain the expression:

$$\text{Log}\frac{r1 + r2}{\sqrt{2}}$$

Under these conditions this expression may be written:

$$\text{Log}\frac{r1 + r2}{\sqrt{2}} = \text{Log}\frac{1}{\sqrt{2}} + \text{Log}(r1 + r2)$$

$$= \text{Log}\frac{1}{\sqrt{2}} + \text{Log}\left[r1 \times \left(1 + \frac{r2}{r1}\right)\right]$$

$$= \text{Log}\frac{1}{\sqrt{2}} + \text{Log}\,r1 + \text{Log}\left(1 + \frac{r2}{r1}\right)$$

A so-called normalizing circuit 22 is added to the processing device described in the foregoing. The function of said circuit is to determine the factor $$\text{Log}\frac{1}{\sqrt{2}}$$

and to perform the addition of said factor and of the result delivered by the summing circuit 21. This operation virtually consists in subtracting 3 dB from the result delivered in digital code by the addition circuit 21.

In this embodiment which dispenses with the need for converting logarithmic expressions to linear expressions and conversely, it will be noted that the dead memory 20 has a capacity of the order of 256×8 bits, this capacity being relatively small compared with the capacity of the dead memory employed in the prior art.

FIG. 3 illustrates an alternative embodiment of the device of FIG. 2 in which the relative magnitude of the expressions r1 and r2 is taken into account, thereby entailing the need to introduce a comparison circuit. Consequently in FIG. 2 and in FIG. 3, the circuits which perform the same functions and are located in the same position are designated by the same references.

The signals Log r1 and Log r2 are digitally coded in the coders 11 and 12 which are controlled respectively by the clock 13. Said coders are each connected to two comparators 23 and 24. The function of the comparator 23 is to determine which expression Log r1 and Log r2 has the maximum value and the comparator 24 has the function of determining which expression Log r1 and Log r2 has the minimum value.

The outputs of said comparators 23, 24 are connected respectively to the two inputs of the subtraction circuit 19 which performs the operation Log r1 − Log r2 if r1 is of higher value than r2 or the operation Log r2 − Log r1 if r2 is of higher value than r1. As the case may be, the transcoder 20 connected to the subtractor 19 performs the operation $$\text{Log}\frac{r1}{r2} \text{ which gives Log}\left(1 + \frac{r1}{r2}\right)$$

or $$\text{Log}\frac{r2}{r1} \text{ which gives Log}\left(1 + \frac{r2}{r1}\right)$$

The addition circuit 21 is connected on the one hand to the transcoding circuit 20 and to the comparator 23, for example, and receives from this latter either the expression Log r1 or the expression Log r2. This adder 21 delivers the expression Log (r1+r2) which it is sought to obtain.

In its application to a frequency-diversity radar, the device according to the invention further comprises a delay circuit 10 for delaying the signals Log r2 for example by the value ΔT, this circuit being inserted between the coder 12 and the comparator 24, and a so-called normalizing and adding circuit 22 which divides the expression delivered by the circuit 21 by $\sqrt{2}$ and delivers at its output S the expression $$\text{Log} \frac{r1 + r2}{\sqrt{2}}$$

which is sought for a radar system.

FIG. 4 illustrates a more detailed embodiment of the device of FIG. 3 in which the comparators 23 and 24 are replaced by a comparator 25 and two multiplexing circuits 26 and 27. The coders 11 and 12 deliver respectively the expressions Log r1 and Log r2 in the form of two binary words each consisting, for example, of eight bits. These words are applied respectively to the two inputs of a comparator 25 which performs a bit-by-bit comparison of the two binary words. In the case of the application to a frequency-diversity radar system, one word is delayed within the circuit 10, thus imparting a digital time-delay ΔT to the digital word which is representative of Log r2, for example. The output of the comparator 25 supplies on the one hand the multiplexer 26 which is connected to the coder 11 and to the coder 12, if necessary via the delay circuit 10, and on the other hand the multiplexer 27 which is also connected to the coder 11 and to the coder 12, if necessary via the delay circuit 10. In actual practice, the multiplexers mentioned above are electronic switches controlled by the comparison bit delivered by the comparator 25, said switches being caused to open according as the expressions Log r1 and Log r2 are of maximum or minimum value. As the case may be and as already explained with reference to the previous figure, the subtractor 19 to which the multiplexers 26 and 27 are connected performs the function Log r1−Log r2 or Log r2−Log r1. The transcoder 20 which is connected to the subtractor 19 and is, for example, a PROM dead memory having a capacity of 256×8 performs the function $$\text{Log}\left(1 + \frac{r1}{r2}\right) \text{ or } \text{Log}\left(1 + \frac{r2}{r1}\right)$$

This function is transmitted by said memory to the adder 21 which also receives Log r1 or Log r2, depending on whether this expression is larger than the other. In the application to radar systems, an adding circuit 22 performs the function $$\text{Log} \frac{r1 + r2}{\sqrt{2}}$$

which it delivers in the form of an 8-bit binary word.

The device for processing logarithmic signals described in the foregoing achieves the combination of at least two digital signals which are given in their logarithmic form.

There has also been described the application of a device of this type to a frequency-diversity radar which operates at two different frequencies and the transmitters of which are turned-on at instants which are relatively displaced by a time interval ΔT.

However, the device according to the invention is not limited to the processing of two signals. The principle of operation being similar to that described in the foregoing, said device is also capable of processing three or more signals. In fact, if Log r1, Log r2 and Log r3 are three signals expressed in their logarithmic form (which can clearly be the video signals of a frequency-diversity radar which operates at three different frequencies F1, F2, F3), a first device in accordance with those described earlier with reference to FIG. 2 or FIG. 3 can perform the calculation on Log r1 and Log r2 for delivering Log (r1+r2). This signal is processed in a device of the same type with the signal Log r3. If the number of logarithmic signals increases, it is always possible to process the signals in succession until the desired final result is obtained, that is, Log (r1+r2+r3 . . . +rn).

FIG. 5 is a schematic diagram of a complete device for processing a plurality of logarithmic signals with a view to delivering in its logarithmic form the sum of the signals which appear under the logarithm sign.

FIG. 5 clearly shows the arrangement of the different processing circuits 28, 29, 30 employed in which all the signals are processed in iterative form. In the case of application to frequency-diversity radar systems, each processing device will further comprise a so-called normalizing circuit and a delay circuit in which the time-delay will vary by a value ΔT from one device to the next; the first delay circuit will thus produce a time-delay ΔT, the second circuit within the second processing device will produce a time-delay 2ΔT and so on.

As described in the foregoing, a device for processing logarithmic signals carries out recombination of said signals in such a manner as to deliver their sum in a logarithmic form. The description has also been directed to the application of the signal-processing device in accordance with the invention to a frequency-diversity radar as well as to a radar system equipped with said device.

We claim:

1. In a frequency diversity radar a device for the digital processing of logarithmic signals which upon receiving at least two signals r1 and r2 in their logarithmic form, delivers a logarithmic signal of the sum of said signals under the logarithm symbol, Log (r1+r2), comprising:

a first coder adapted for connection to a first logarithmic signal receiver for delivering signal Log r1;
   a second coder adapted for connection to a second logarithmic signal receiver for delivering signal Log r2;
   a subtraction circuit receiving the outputs of said first and second coders respectively and delivering the logarithm of the ratio of said signals r1 and r2;
   a transcoding circuit connected to said subtraction circuit for delivering signal Log (1+(r1/r2)); and
   an addition circuit having two inputs, the first one connected to said transcoding circuit and the second one to the coder of which the signal has been subtracted in said subtraction circuit, the output of said addition circuit being said logarithmic signal.

2. A processing device according to claim 1, wherein said device further includes comparison circuit means for receiving the logarithmic signals (Log r1 and Log r2) from said first and second coder and determining which signal is the higher value, the output of said comparison means being connected to the subtraction circuit which performs the operation Log r1−Log r2 if r1 is the higher value or the operation Log r2−Log r1 if r2 is the higher value.

3. A processing device according to claim 2, wherein the comparison means includes a single comparison circuit connected to said first and second coder, and two multiplexing circuits for selecting, under the control of the comparator output signal, the logarithmic signal of highest value, the two multiplexing circuits being both connected to said subtraction circuit.

4. A processing device according to claim 1, wherein said transcoding circuit is a PROM dead memory having a relatively small capacity.

5. A processing device according to claim 4, wherein the dead memory has a capacity of the order of 256×8 bits.

6. A processing device according to claim 1 in which said radar operates at two different frequencies, the transmission of which are relatively displaced by a time interval $\Delta T$ and the receivers of which deliver video signals in logarithmic form (Log r1, Log r2), further comprising a delay circuit connected between said second coder and said subtraction circuit and a normalizing and adding circuit connected to the output of the addition circuit for performing the operation $$\text{Log} \frac{1}{\sqrt{2}} + \text{Log}(r1 + r2)$$

and delivering the desired video signal $$\left( \text{Log} \frac{r1 + r2}{\sqrt{2}} \right).$$

7. In a frequency diversity radar as in claim 1 further including a predetermined number of said processing devices connected to each other in series and each adapted to receive input signals consisting of the output signal of the preceding device and of an input logarithmic signal which has not yet been processed.

8. A predetermined number of processing devices according to claim 7 in which said frequency-diversity radar operates at a number of frequencies, the transmissions of which are relatively displaced by a time interval $\Delta T$ and the receivers of which are adapted to deliver video signals in their logarithmic form, wherein each processing device comprises a delay device connected to a coder for receiving one of the video signals, said delay device being adapted to produce a time-delay $(n-1)\Delta T$ for synchronizing said video signal with said output signal from the preceding device and a normalizing circuit constituting the processing device output connected to the following processing device, n being the number of logarithmic video signals processed.

* * * * *